T. ROSE.
GEAR SHIFT LOCK.
APPLICATION FILED JULY 11, 1918. RENEWED AUG. 29, 1921.
1,394,357. Patented Oct. 18, 1921.
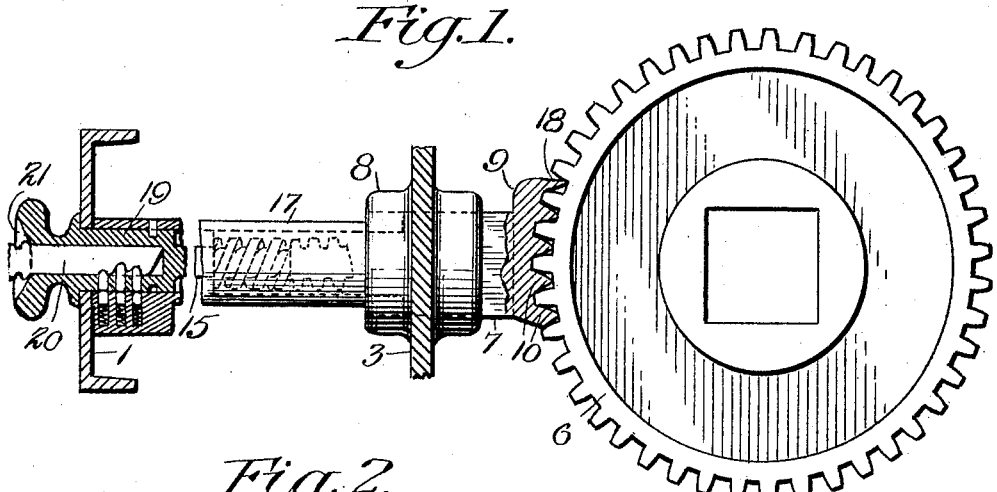
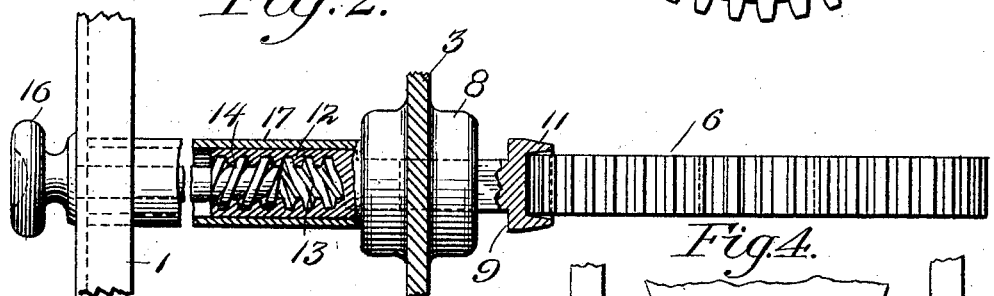
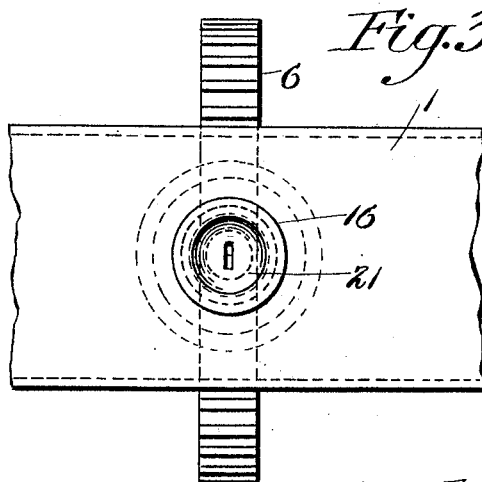
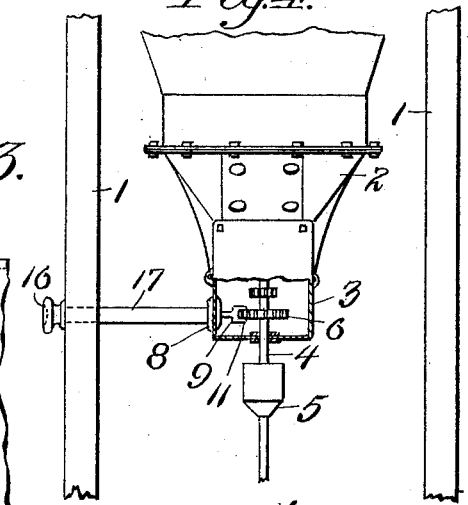
Inventor.
Thomas Rose,
by Pennie, Goldsborough & Ohio
attys.

UNITED STATES PATENT OFFICE.

THOMAS ROSE, OF PHILADELPHIA, PENNSYLVANIA.

GEAR-SHIFT LOCK.

1,394,357.　　　　　Specification of Letters Patent.　　Patented Oct. 18, 1921.

Application filed July 11, 1918, Serial No. 244,346. Renewed August 29, 1921. Serial No. 496,755.

*To all whom it may concern:*

Be it known that I, THOMAS ROSE, a citizen of the United States, residing at Philadelphia, in the county of Philadelphia and State of Pennsylvania, have invented certain new and useful Improvements in Gear-Shift Locks; and I do hereby declare the following to be a full, clear, and exact description of the invention, such as will enable others skilled in the art of which it appertains to make and use the same.

This invention relates to a gear shift lock, and is particularly applicable to gear shifts of the selective type which are used in propelling vehicles.

An object of the invention resides in the provision of a lock which is engageable with the gear on the propeller shaft and which prevents the rotation of the propeller shaft.

A further object of the invention resides in the provision of means whereby the shifting of the gears while they are locked, is prevented.

With these and other objects in view, such as will appear as my description progresses, my invention comprises the combination and arrangement of parts as set forth in and falling within the scope of the appended claims.

In the drawing:

Figure 1 is a sectional view of a lock showing the same in its operative position, the lock being located on a vehicle;

Fig. 2 is a plan view of the same with a portion broken away;

Fig. 3 is a detail looking at the end of the operating knob, and

Fig. 4 is a view disclosing a manner in which the lock is applied to the gear shift of an automobile.

I have illustrated a portion of an automobile which includes the side bars 1 of the frame thereof, and includes also the clutch casing 2 and the gear shift casing 3. The propeller shaft 4 having the usual universal joint 5 therein, extends into the gear shift casing 3 and is provided with the usual gear 6, which is arranged to rotate the shaft. My device is adapted to engage with this gear 6 to prevent the rotation of the shaft, and it includes a rectangular slide 7 which is mounted within the boss 8 formed on one side of the gear shift casing 3. This slide 7 is provided at its end with a head 9 having a plurality of teeth 10 thereon, adapted to engage with the teeth of the gear 6. When the teeth 10 are in engagement with the teeth of the gear 6 and the slide 7 is held in position, the rotation of the gear and consequently the rotation of the propeller shaft 4 and the rear wheels of the vehicle will be prevented. The teeth on the head are adapted to engage with the teeth on the gear when the latter is in its neutral position, and the head is provided with flanges 11, which embrace the sides of the gear and prevent its being shifted from its neutral position into its operative relation with the driving gear. In order that the head 9, and consequently the teeth 10, may be moved into engagement with the teeth 6 or retracted therefrom, I have provided the slide 7 with an extension 12, which has an internal thread 13. This thread is engaged by the threads 14 on a spindle 15, which spindle extends through one of the bars 1 of the frame of the vehicle and is provided on its end with an operating knob 16. The extension 12 and the spindle 15 are inclosed in a casing 17, so that they will be protected and kept free from dirt. When the knob 16 is turned the slide 7 will be moved in either one direction or the other, and consequently will move the teeth into or out of engagement with the teeth 6. It may sometimes occur that when the head is moved toward the gear 6 the teeth 10 on the head will engage with the edges of the teeth of the gear 6 and will consequently not pass between the same. Therefore, in order to impart sufficient movement to the gear 6 to permit the teeth 10 to pass between the teeth of the gear, I have provided the head 9 with a master tooth 18, which is provided with a cam face and is adapted to engage with a tooth of the gear 6 to impart slight movement to the gear, that is to say, sufficient movement to permit the teeth 10 to enter between the teeth of the gear.

The spindle 15 is provided with a lock 19, which may be of any desirable form, and which will operate to prevent the rotation of the spindle, except when it is released by a proper key 20. This key may be inserted through the knob 16 and will be guided into the key-hole by a depression 21 in the knob 16. The use of this depression is particularly valuable, because of the fact that no difficulty in inserting the key in the key-hole will be encountered, even when the operator attempts to do so in the dark.

In using the device the gears are shifted to the neutral position, and as the operator steps from the machine he turns the knob 16, the knob being located at a convenient point on the machine, for instance, immediately below the door adjacent to the driver's seat. The rotation of this knob will cause the teeth 10 on the head 9 to engage with the teeth on the gear 6, and these teeth will prevent the rotation of the gear, and consequently any movement of the rear wheels. The flange 11 will prevent the shifting of the gears so that even should a person be successful in starting the engine, it would be impossible for him to shift the gears and thus subject them to undue strain and possible stripping. The head 9 may, of course, be released by the reverse operation.

While I have described the device as particularly applicable to motor vehicles, it is to be understood that its use is not confined to such vehicles, as it may be used in very many other relations where a gear shift is employed.

What I claim is:—

1. The combination with a driving gear shiftable into operative position, of a slide having teeth engageable with the teeth of the gear and having flanges embracing the sides of the gear, and means for moving the slide to and from operative position.

2. The combination with a driving gear shiftable into operative position, of a slide having teeth engageable with the teeth of the gear and having flanges embracing the sides of the gear, means for moving the slide to and from operative position, and means for locking the slide against movement.

3. The combination with a rotatable and axially movable gear, of a slide having a head arranged to engage the gear to prevent both movements and having an internal screw thread, a screw threaded spindle engaged therewith and adapted to move the slide to its operative and inoperative positions.

4. In an automobile lock, the combination with the transmission casing, the propeller shaft extending from said casing, and the transmission gearing in said casing including a gear rotatable with said propeller shaft; of a dog in said casing for locking said gear against rotation, flanges on said dog adapted to straddle said gear, and means for operating and locking said dog from the exterior of the casing.

5. In an automobile lock, the combination with the transmission casing, the propeller shaft extending from said casing; and the transmission gearing in said casing including a gear rotatable with said propeller shaft, of a single dog mounted in said casing for locking said gear against rotation and against sliding into mesh with another gear, and means for operating and locking said dog from the exterior of the casing.

In testimony whereof I affix my signature.

THOMAS ROSE.